US009493677B2

(12) United States Patent
Lim et al.

(10) Patent No.: US 9,493,677 B2
(45) Date of Patent: Nov. 15, 2016

(54) POLISHING COMPOSITION, METHOD FOR FABRICATING THEREOF AND METHOD OF CHEMICAL MECHANICAL POLISHING USING THE SAME

(71) Applicants: SK HYNIX INC., Icheon (KR); Korea University Research and Business Foundation, Seoul (KR)

(72) Inventors: Dae Soon Lim, Seoul (KR); Il Ho Yang, Icheon (KR); Seung Koo Lee, Seoul (KR); Dong Hee Shin, Goyang (KR); Dong Hyeon Lee, Seoul (KR); Yang Bok Lee, Seoul (KR)

(73) Assignees: SK HYNIX INC., Icheon (KR); KOREA UNIVERSITY RESEARCH AND BUSINESS FOUNDATION, Seongbuk-Gu (KR)

( * ) Notice: Subject to any disclaimer, the term of this patent is extended or adjusted under 35 U.S.C. 154(b) by 102 days.

(21) Appl. No.: 13/924,379

(22) Filed: Jun. 21, 2013

(65) Prior Publication Data

US 2013/0344777 A1    Dec. 26, 2013

(30) Foreign Application Priority Data

Jun. 22, 2012 (KR) .................. 10-2012-0067580

(51) Int. Cl.
*C09G 1/02*      (2006.01)
*B24B 37/04*    (2012.01)

(52) U.S. Cl.
CPC .............. *C09G 1/02* (2013.01); *B24B 37/044* (2013.01)

(58) Field of Classification Search
CPC .................................. C09G 1/02; B24B 37/044
(Continued)

(56) References Cited

U.S. PATENT DOCUMENTS 6,258,140 B1 *  7/2001  Shemo ................. G11B 5/8404
                                                         106/3
6,599,962 B2 *  7/2003  McCleskey et al. ......... 523/330
(Continued)

FOREIGN PATENT DOCUMENTS

KR    10-2003-0048032 A    6/2003
KR    10-2010-0128971 A    2/2010
(Continued)

*Primary Examiner* — Joseph J Hail
*Assistant Examiner* — Joel Crandall

(57) ABSTRACT

Provided are a polishing composition for chemical mechanical polishing, a method of preparing the polishing composition, and a chemical mechanical polishing method using the polishing composition. The polishing composition which is a water-based polishing composition for planarizing a metal compound thin film including two or more metal elements includes nano-diamond particles as a polishing material and poly(sodium 4-styrenesulfonate) as a dispersion stabilizer for the nano-diamond particles in the polishing composition. Since the nano-diamond particles in the polishing composition have hydrophobic surfaces and poly (sodium 4-styrenesulfonate) effectively stabilizes the nano-diamond particles to prevent the nano-diamond particles from aggregating, excellent polishing characteristics for the metal compound thin film may be obtained due to the nano-diamond particles which have a nano size, high hardness, and excellent dispersibility.

10 Claims, 7 Drawing Sheets

(58) Field of Classification Search
USPC .......................................................... 451/60
See application file for complete search history.

(56) References Cited

U.S. PATENT DOCUMENTS

| | | | | |
|---|---|---|---|---|
| 2004/0033757 | A1* | 2/2004 | Chandrasekaran | ... B24B 37/044 451/41 |
| 2005/0153643 | A1* | 7/2005 | Simpson | ............... B24B 37/245 451/526 |
| 2005/0159085 | A1* | 7/2005 | Scott | ..................... B24B 37/044 451/41 |
| 2005/0211953 | A1* | 9/2005 | Jha et al. | ..................... 252/79.1 |
| 2005/0263407 | A1* | 12/2005 | Brusic | ............... H01L 21/32125 205/684 |
| 2007/0084134 | A1* | 4/2007 | Wang | ..................... B82Y 30/00 51/309 |
| 2009/0014415 | A1* | 1/2009 | Chelle et al. | ................... 216/53 |
| 2010/0112906 | A1* | 5/2010 | Liu | ............................... 451/41 |

FOREIGN PATENT DOCUMENTS

| | | |
|---|---|---|
| KR | 10-1047293 B1 | 7/2011 |
| KR | 10-2011-0122216 A | 11/2011 |
| WO | WO 02/31079 A1 | 4/2002 |
| WO | WO 2004/044075 A2 | 5/2004 |
| WO | WO 2010/105240 A2 | 9/2010 |

* cited by examiner

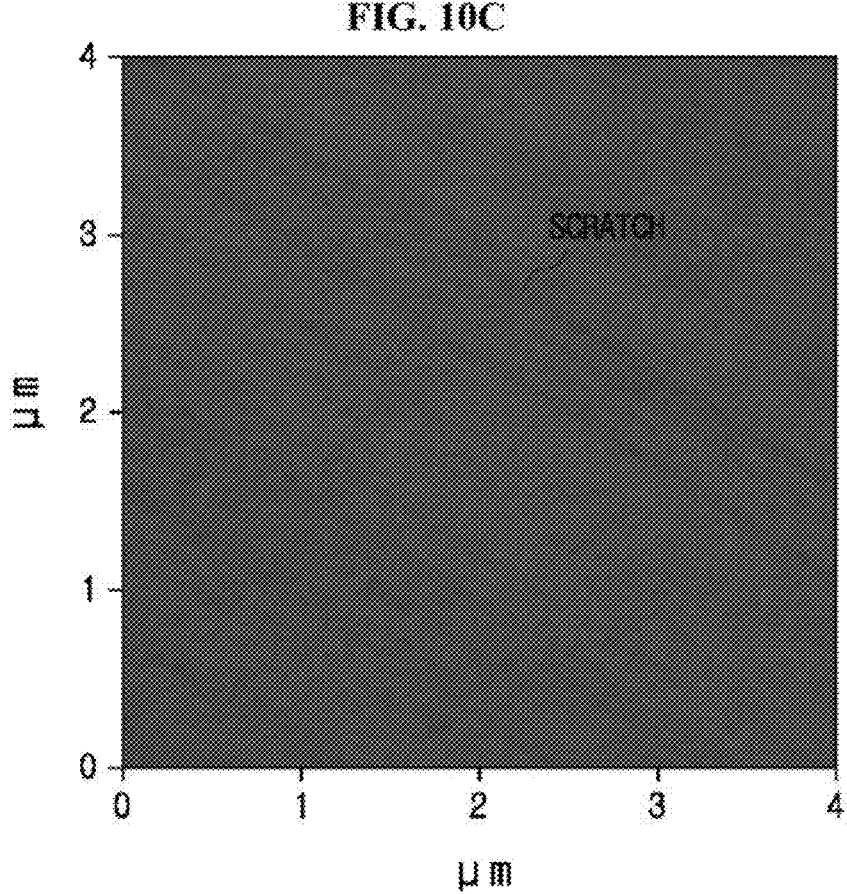

POLISHING COMPOSITION, METHOD FOR FABRICATING THEREOF AND METHOD OF CHEMICAL MECHANICAL POLISHING USING THE SAME

CROSS-REFERENCES TO RELATED APPLICATION

This application claims the benefit of Korean Patent Application No. 10-2012-0067580, filed on Jun. 22, 2012, in the Korean Intellectual Property Office, the disclosure of which is incorporated herein in its entirety by reference.

BACKGROUND

1. Technical Field

The present invention relates to a semiconductor device manufacturing technology, and more particularly, to a polishing composition for chemically-mechanically polishing a metal compound thin film, a method of preparing the polishing composition, and a chemical mechanical polishing method using the polishing composition.

2. Related Art

As demands for portable digital application devices such as a digital camera, an MP3 player, a personal digital assistant (PDA), and a mobile phone have recently increased, the nonvolatile memory market has grown rapidly. As flash memories which are programmable nonvolatile memory devices have reached their scaling limits, phase-change random-access memories (PcRAMs) or resistive random-access memories (ReRAMs) using a variable resistor whose resistance value may be reversely changed have attracted attention as alternative nonvolatile memory devices. Since the alternative nonvolatile memory devices may use physical characteristics of the variable resistor as data, cells may be simply configured and thus the alternative nonvolatile memory devices may be miniaturized.

Since a resistance value of a chalcogenide material such as a germanium (Ge)-antimony (Sb)-tellurium (Te) alloy is changed according to a phase change or a magnitude or a width of an electrical signal applied to the chalcogenide material, the chalcogenide material has been widely studied as a material for a nonvolatile memory device. In the nonvolatile memory device, the chalcogenide material is formed to have a damascene structure that fills holes formed in an interlayer insulating film in order to increase a degree of integration, a chemical mechanical polishing (CMP) method may be used as a planarization method using etch-back.

However, since the chalcogenide material is a multi-component metal alloy including two or more metal elements, the chalcogenide material may encounter a problem which is different from a problem of copper or aluminum which is conventionally used for a wiring encounters during a CMP process. Also, when the chalcogenide material is formed to have a damascene structure, since the chalcogenide material may be formed to have a cell pitch equal to or less than 20 nm in order to have a high degree of integration, a surface to be polished is required to have a low surface roughness and a low defect density. However, since a colloidal silica slurry has a high surface roughness, it is difficult to increase a resolution of a lithography process.

Such requirements apply not only to a material for a phase-change memory device such as a chalcogenide material but also to a metal oxide material including two or more metal elements such as a perovskite-based metal compound such as $PbZr_xTi_{1-x}O_3$.

SUMMARY

Embodiments of the present invention include a polishing composition for chemically-mechanically polishing a metal compound thin film including two or more metal elements applied to a nonvolatile memory device with a low environmental load, high reliability, and low costs.

Embodiments of the present invention also include a method of preparing the polishing composition.

Embodiments of the present invention also include a chemical mechanical polishing method performed on a substrate having a surface on which a multi-component metal compound thin film is formed by using the polishing composition.

According to an aspect of the present invention, there is provided a water-based polishing composition for planarizing a metal compound thin film including two or more metal elements, the polishing composition including: nano-diamond particles as a polishing material; and poly(sodium 4-styrenesulfonate) as a dispersion stabilizer for the nano-diamond particles in the polishing composition.

The nano-diamond particles may have an average particle size of 10 nm to 120 nm. The nano-diamond particles may include secondary particles provided by aggregating primary particles having an average particle size of 3 nm to 5 nm.

The polishing composition may further include deionized water, an oxidizer, a surfactant, a pH adjusting agent, or a combination thereof. The metal compound thin film may include a chalcogenide material, a chalcogenide glass material, a perovskite-based material, or a combination thereof.

According to another aspect of the present invention, there is provided a method of preparing a polishing composition for planarizing a metal compound thin film including two or more metal elements, the method including: providing a water-based mixture including nano-diamond powder and poly(sodium 4-styrenesulfonate); and attrition milling the water-based mixture. In a method of preparing the polishing composition, zirconia round bead is used as a milling material.

According to another aspect of the present invention, there is provided a chemical mechanical polishing method performed on a substrate having a surface on which a metal compound thin film including two or more metal elements is formed, the chemical mechanical polishing method including: providing the surface of the substrate to contact a polishing pad; providing a polishing composition between the polishing pad and the surface of the substrate, the polishing composition including nano-diamond particles as a polishing material and poly(sodium 4-styrenesulfonate) as a dispersion stabilizer for the nano-diamond particles in the polishing composition; and polishing the metal compound thin film by using the polishing composition.

BRIEF DESCRIPTION OF THE DRAWINGS

Hereinafter, embodiments of the present invention will be described in greater detail with reference to the accompanying drawings.

FIGS. 10A through 10C are atomic force microscope (AFM) images for measuring a surface roughness of a chalcogenide thin film after chemical mechanical polishing (CMP).

DETAILED DESCRIPTION

Figure 1:
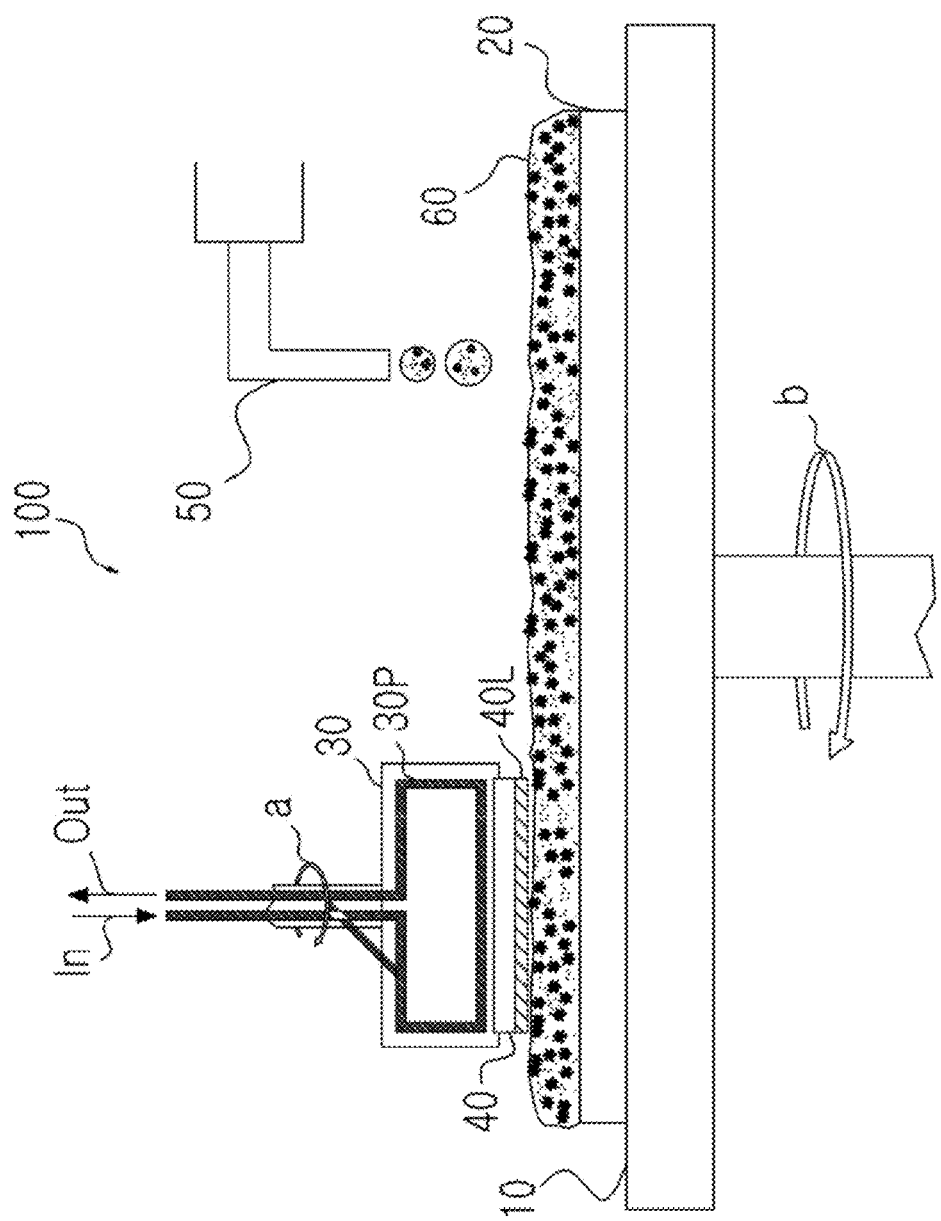
FIG. 1 is a view illustrating a chemical mechanical polishing (CMP) method performed on a substrate on which a metal compound thin film is formed by using a CMP apparatus, according to an embodiment of the present invention.

Hereinafter, exemplary embodiments will be described in greater detail with reference to the accompanying drawings.

The present invention will now be described more fully with reference to the accompanying drawings, in which exemplary embodiments of the invention are shown.

The invention may, however, be embodied in many different forms and should not be construed as being limited to the embodiments set forth herein; rather these embodiments are provided so that this disclosure will be thorough and complete, and will fully convey the concept of the invention to one of ordinary skill in the art.

In the drawings, the same reference numerals denote the same elements. As used herein, the term "and/or" includes any and all combinations of one or more of the associated listed items.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

In the description, relative terms such as "below," "above," "upper," "lower," "horizontal," and "vertical," should be construed to refer to the orientation as then described or as shown in the drawing under discussion. It will be understood that these relative terms are intended to encompass different orientations of a device in use or operation in addition to the orientation depicted in the drawings.

FIG. 1 is a view illustrating a chemical mechanical polishing (CMP) method performed on a substrate 40 on which a metal compound thin film 40L is formed by using a CMP apparatus 100, according to an embodiment of the present invention.

Referring to FIG. 1, the CMP apparatus 100 may include a platen 10 which is a polishing platform, a polishing pad 20, and a polishing head 30. The polishing head 30 may further include a mechanism that may support the substrate 40 and may provide a rotational force to the substrate 40.

The substrate 40 may be supported by the polishing head 30 such that the metal compound thin film 40L including two or more metal elements to be polished faces the polishing pad 20, and the polishing head 30 may apply a pressure to the substrate 40 against the polishing pad 20. The pressure may range from about 0.02 kg/cm$^2$ to about 0.1 kg/cm$^2$. A material of the polishing pad 30 may be appropriately selected in consideration of a hardness and a porosity of the material.

The substrate 40 and the polishing pad 20 may respectively rotate in directions marked by arrows 'a' and 'b'. The polishing pad 20 may rotate at about 30 RPM to about 120 RPM. Also, the substrate 40 may rotate at about 70 RPM to about 120 RPM.

A polishing composition 60 is supplied to the polishing pad 20 by a slurry dispenser 50. The polishing composition 60 may be supplied until a surface of the polishing pad 20 is saturated. The polishing pad 20 transfers the polishing composition 60 to a position under the polishing head 30 that rotates, and the metal compound thin film 40L formed on the substrate 40 may be chemically-mechanically polished by means of the polishing composition 60.

In order to adjust polishing characteristics of the metal compound thin film 40L, the CMP apparatus 100 may include a temperature adjusting unit. The temperature adjusting unit may further include a cooling unit provided on the polishing head 30. The cooling unit may cool the substrate 40 so that a polishing process is performed at about 10° C. to about 40° C., preferably, at about 15° C. to about 30° C. For example, the cooling unit may include a fluid path 30P provided in the polishing head 30 and a coolant that circulates through the fluid path. Alternatively, in order to cool the polishing composition 60, the slurry dispenser 50 may include a cooling unit such as the fluid path 30P and the coolant.

Although the CMP apparatus 100 includes only one polishing head 30 in FIG. 1, a plurality of the polishing heads 30 may be provided and may simultaneously rotate over the polishing pad 20. Also, a plurality of the substrates 40 may be supported by one polishing head 30 and a CMP process may be performed on the plurality of substrates 40. Alternatively, unlike the CMP apparatus 100 of FIG. 1 in which both the polishing pad 20 and the substrate 40 rotate, a planarization apparatus in which any one of the polishing pad 20 and the substrate 40 rotates and the other linearly moves may be provided. For example, a modified CMP apparatus may have a structure in which the polishing head 30 supporting the substrate 40 rotates and the polishing pad 20 linearly passes through the polishing head 30.

The polishing composition 60 includes nano-diamond particles, and poly(sodium 4-styrenesulfonate) or poly(4-styrenesulfonic acid) sodium salt (hereinafter, referred to as PSS) for dispersing and stabilizing the nano-diamond particles. The polishing composition 60 may further include deinozed water for liquefying the polishing composition 60, and hydrogen peroxide which is an oxidizer.

A content of the nano-diamond particles in the polishing composition 60 may range from 0.01 weight % to 10 weight %, and a content of the PSS in the polishing composition 60 may range from 0.03 weight % to 2 weight %. When a content of the nano-diamond particles is less than 0.01 weight %, a polishing rate is rapidly reduced. Also, when a content of the nano-diamond particles is greater than 10 weight %, a surface roughness is degraded. When a content of the PSS is less than 0.03 weight %, dispersion stability of the nano-diamond particles is reduced. When a content of the PSS is greater than 2 weight %, since the PSS is polymerized, polishing characteristics of the nano-diamond particles are degraded, and a polishing rate is reduced.

A content of the deionized water in the polishing composition 60 may range from 80 weight % to 99 weight %, and a content of the hydrogen peroxide in the polishing composition 60 may range from 0.1 weight % to 10 weight %. If necessary, in order to improve stability of the polishing composition 60, a surfactant and a pH adjusting agent may be further added.

The polishing composition 60 may be prepared as a water-based slurry based on deionized water. A slurry using deionized water is easier to handle, has lower preparation costs, and less adversely affects the environment than an oil-based slurry. A CMP slurry for polishing a metal film requires an oxidizer, and in general, an oxidizer is not mixed with an oil-based agent. Accordingly, when the polishing composition 60 is prepared as a water-based slurry including an oxidizer such as hydrogen peroxide, a surface roughness may be maximally reduced by using chemical etching and physical etching. In particular, since PSS is used in the water-based slurry in the present invention, dispersion stability of the nano-diamond particles may be drastically improved.

The nano-diamond particles may include primary particles having an average particle size of about 3 nm to about 5 nm. The primary particles may naturally aggregate, and in this case, the nano-diamond particles may have an average size of 10 nm to 120 nm. Alternatively, the nano-diamond particles may include primary particles having an average particle size of 10 nm to 120 nm.

The nano-diamond particles including primary particles or secondary particles having an average particle size of 10 nm to 120 nm may be used as a polishing material. When a size of the nano-diamond particles is less than 10 nm, it may be difficult to have a desired polishing rate. When a size of the nano-diamond particles is greater than 120 nm, a scratch may occur or polishing uniformity may be reduced.

While the metal compound thin film 40L on the substrate 40 is polished, metal elements of the metal compound thin film 40L may be oxidized due to an oxidizer in the polishing composition 60, for example, hydrogen peroxide. As a result, since a surface of the metal compound thin film 40L is continuously exposed to the oxidizer during the polishing process, a metal oxide layer may be continuously formed. The nano-diamond particles may polish the metal compound thin film 40L by mechanically polishing the metal oxide layer at a nano level.

When the metal compound thin film 40L includes two or more metal elements, since the metal elements have different oxidation rates, it is difficult to uniformize a polishing mechanism including formation and removal of an oxide layer. Accordingly, a polishing rate may be reduced, a surface roughness of the metal compound thin film 40L which is actually polished may be increased, and a composition of a surface of the metal compound thin film 40L may be different from a composition in the metal compound thin film 40L. When another material layer, for example, an electrode, is subsequently formed, such polishing non-uniformity may induce an interfacial defect which adversely affects a device between the metal compound thin film 40L and the electrode, or may degrade electrical characteristics of the metal compound thin film 40L, thereby reducing the reliability of the device.

According to the present embodiment, however, since the nano-diamond particles which may maintain a high hardness even with a low particle size of a nano level which is compared with conventional silica particles are used as a polishing material, a high polishing rate may be ensured, a uniform etching rate may be provided based on a hardness on the metal compound thin film 40L including two or more metal elements by increasing a reactive surface area to a minute mechanical damage, and thus an excellent surface roughness may be achieved, when compared with a case where a conventional silica polishing material is used. In particular, since the PSS effectively prevents the nano-diamond particles having hydrophobic surfaces from aggregating in the polishing composition 60 which is a water-based composition, dispersibility of the nano-diamond particles may be improved, and thus advantages of the nano-diamond particles as a polishing material may be maximized.

A wiring structure such as a word line or a bit line, and a selection device such as a diode or a transistor may be formed on the substrate 40 as is well known in the art. In order to form memory cells electrically connected to the circuit elements, the metal compound thin film 40L may be used. The metal compound thin film 40L may have an array structure electrically connected to the circuit elements by being buried in a plurality of holes formed in an interlayer insulating film.

When a memory device is a phase-change memory device, the metal compound thin film 40L may have a mushroom structure in which a portion of the metal compound thin film 40L is buried in the holes and another portion of the metal compound thin film extends to be disposed over the interlayer insulating film, or a filament structure in which the metal compound thin film 40L is completely buried in the holes of the interlayer insulating film. The CMP method according to the present embodiment may be used as an etchback or planarization process for forming a fine pattern of the metal compound thin film 40L having any of the various structures.

When the memory device is a phase-change memory device, the metal compound thin film 40L may be formed of, for example, a chalcogenide material such as a germanium (Ge)-antimony (Sb)-tellurium (Te) alloy. Te is less easily oxidized than Ge and Sb. As a result, since Te is less easily etched than Ge and/or Sb during a CMP process, polishing non-uniformity may occur. However, when the nano-diamond particles having a high hardness at a nano level and improved dispersion stability are used as a polishing material, the polishing non-uniformity due to a reaction difference between metal elements may be solved.

The Ge—Sb—Te alloy is exemplary, and any of other chalcogenide materials or chalcogenide glass materials such as GeSe, GeTeAs, GeSnTe, SeSnTe, GaSeTe, GeTeSnAu, $SeSb_2$, InSe, GeTe, BiSeSb, PdTeGeSn, InSeTiCo, InSbTe, $In_3SbTe_2$, $GeTeSb_2$, $GeTe_3Sb$, GeSbTePd, AgInSbTe, and CuSe may have the same advantages. Also, the metal compound thin film 40L according to the present embodiment of the present invention is not limited to a metal compound thin film formed of a chalcogenide material or a chalcogenide glass material, and may be a pebrovskite-based metal oxide thin film formed of $PbZr_xTi_{1-x}O_3$ used in a memory device such as a variable resistive thin film or a magnetic thin film formed of NiFe or CoZr including two or more metal elements.

The present invention will be explained in further detail by using specific test examples. However, the disclosure is just for describing the present invention and the present invention should not be construed as being limited thereto.

Test 1: Relationship Between Attrition Milling Time and Size of Nano-Diamond Particles A polishing composition was prepared as follows. Nano-diamond powder for providing the nano-diamond particles was produced from the detonation of an explosive, and may be large powder having a size of several micrometers formed by aggregating primary particles having a relatively small average particle size of about 3 nm to about 5 nm. The nano-diamond powder which is a raw material is not limited to the detonation of the explosive, and may be obtained by using well-known chemical synthesis.

In order to prepare a polishing material from the nano-diamond powder, a process of adjusting a size of particles by milling the nano-diamond powder to have a predetermined average particle size and a process of dispersing and stabilizing nano-diamond particles obtained by being milled not to aggregate are required.

To this end, the nano-diamond powder and PSS which is a disperser were added to a water-based solvent, for example, a dionized water, and the nano-diamond powder was attrition milled by using zirconia round beads while maintaining dispersibility of the nano-diamond particles obtained from the nano-diamond powder. The attrition milling is effective in minimizing a particle size by mechanically milling the nano-diamond powder coupled with a Van der Waals force. 2500 g of zirconia beads was added for the attrition milling, a milling time was equal to or less than 6 hours, the milling time was 1 hour, 2 hours, 3 hours, 4 hours, 5 hours, and 6 hours, and prepared polishing compositions were defined as samples #1 through #6 to be compared with one another.

A mixture before the attrition milling for obtaining each polishing composition is obtained by mixing 400 ml of deionized water, 0.55 g of nano-diamond particles, 3 g of PSS in powder, and 1.0 weight % of hydrogen peroxide. In this case, a content of the nano-diamond particles in the polishing composition is 1 weight % and a content of the PSS in the polishing composition is 0.94 weight %. The polishing composition may be obtained by attrition milling the mixture to obtain a resultant structure and adding an oxidizer, for example, hydrogen peroxide, to the resultant structure. The hydrogen peroxide may be previously added into the mixture and then milled.

Figure 2:
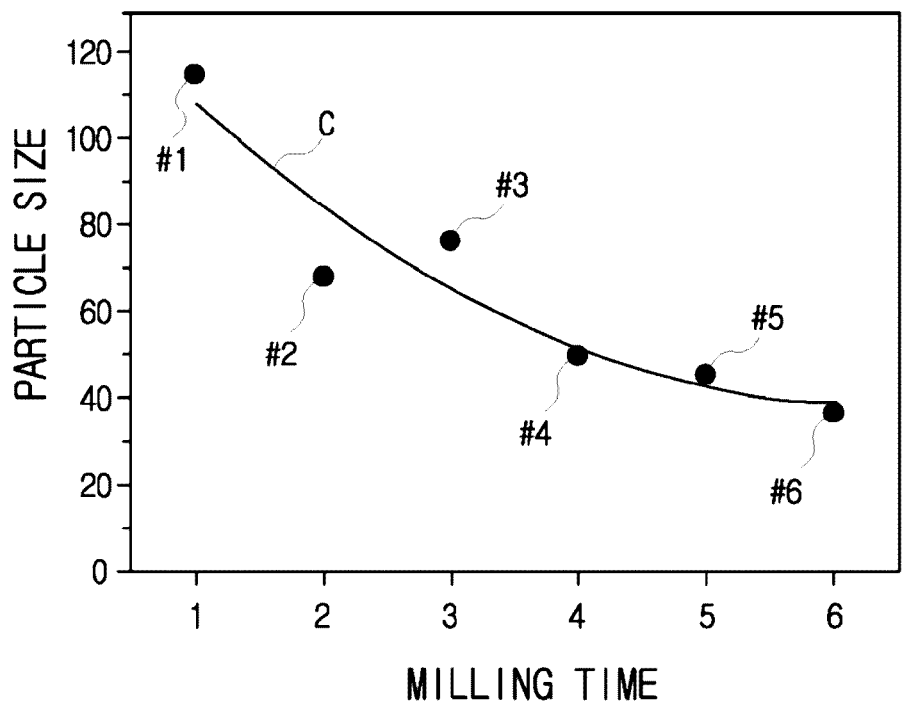
FIG. 2 is a graph illustrating a relationship between an attrition milling time and a size of nano-diamond particles.

FIG. 2 is a graph illustrating a relationship between an attrition milling time and a size of nano-diamond particles. A curve C is a trend line. It is found from FIG. 2 that as the attrition milling time decreases, the size of the nano-diamond particles decreases. Sizes of the nano-diamond particles obtained in the samples #1 through #6 were 11.57 nm, 68.5 nm, 76.8 nm, 50.2 nm, 45.8 nm, and 37 nm. The sizes of the nano-diamond particles of the samples #1 through #6 were within a range from 10 nm to 120 nm considering a polishing rate and a scratch.

Test 2: Comparison of Polishing Characteristics According to Size of Nano-Diamond Particles Polishing characteristics of the polishing compositions according to the samples #1 through #6 and a polishing composition according to a comparative example 1 using a silica slurry instead of nano-diamond particles were compared. A used film to be polished is a chalcogenide thin film having a composition of $Ge_1Sb_6Te_3$ deposited by using atomic layer deposition. The chalcogenide thin film may be formed by using atomic layer deposition, chemical vapor deposition, sputtering, or laser ablation, but the present embodiment is not limited thereto. A size of the chalcogenide thin film to be polished was 2 cm×2 cm.

A used CMP apparatus had the same configuration as that of the CMP apparatus 100 of FIG. 1, a polishing pad was a Polytex pad (which may be obtained from Fujimi Corp.), a speed of a platen was about 50 RPM, a speed of a substrate holder was fixedly about 90 RPM, and a downward pressure was maintained at about 0.05 kg/cm². Each polishing composition was supplied at 10 ml/min, a polishing time in the comparative example 1 using the silica slurry was 20 sec, and a polishing time in the test using the polishing compositions according to the samples #1 through #6 was 40 sec. After polishing, cleaning was performed by using 2 weight % of $NH_4OH$ solution.

Figure 3:
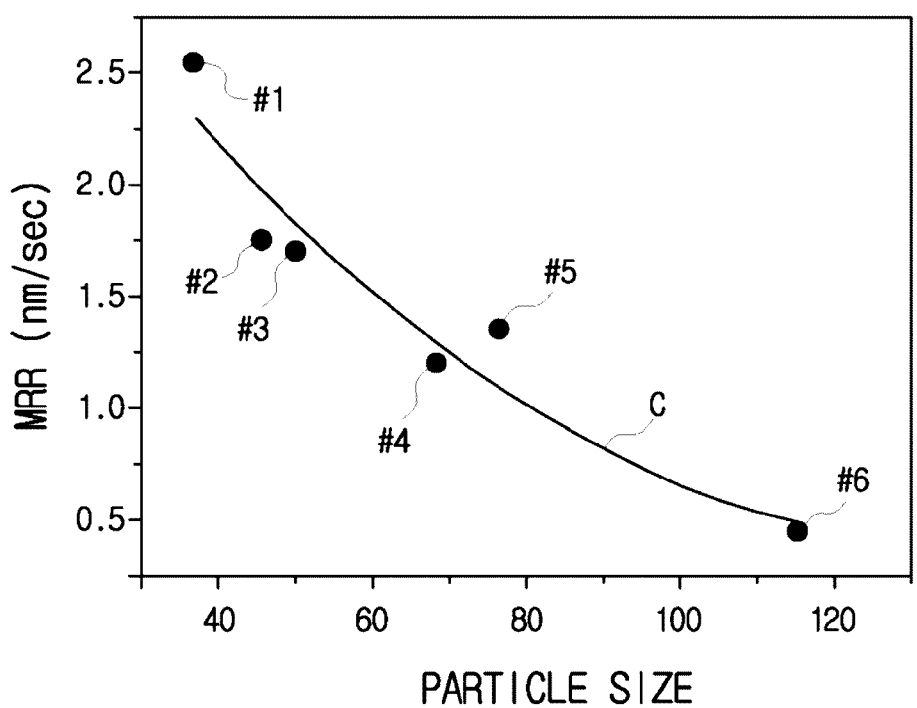
FIG. 3 is a graph illustrating a material removal rate (MRR) of a chalcogenide film formed of GeSbTe to be polished using a polishing composition.

FIG. 3 is a graph illustrating a material removal rate (MMR) of a chalcogenide film formed of GeSbTe to be polished using a polishing composition. A curve C is a trend line.

Referring to FIG. 3, as a size of nano-diamond particles decreases, that is, a milling time during a process of preparing a polishing composition increases, a polishing rate of a layer to be polished increases. When polishing is performed by using the samples #1 through #6, a polishing rate was 0.45 nm/sec, 1.2 nm/sec, 1.35 nm/sec, 1.7 nm/sec, 1.75 nm/sec, and 2.54 nm/sec. In the sample #6 in which a size of the nano-diamond particles is within a range of 10 nm to 40 nm, a polishing rate was equal to or greater than 2 nm/sec.

Figure 4:
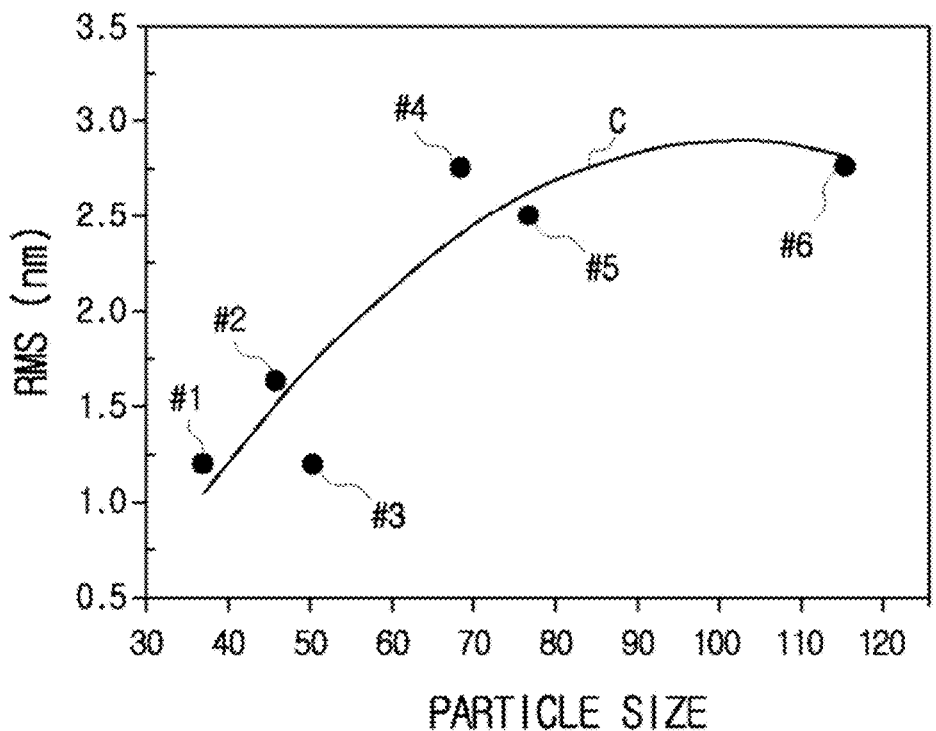
FIG. 4 is a graph illustrating a root-mean-square (RMS) surface roughness of a chalcogenide film formed of GeSbTe to be polished using a polishing composition.

FIG. 4 is a graph illustrating a root-mean-square (RMS) surface roughness of a chalcogenide film formed of GeSbTe to be polished using a polishing composition. A curve C is a trend line.

Referring to FIG. 4, as a size of nano-diamond particles decreases, that is, a milling time during a process of preparing a polishing composition increases, a surface roughness of a layer to be polished decreases. When polishing is performed by using the samples #1 through #6, a surface roughness was 2.8 nm, 2.77 nm, 2.52 nm, 1.2 nm, 1.63 nm, and 1.2 nm.

Figure 5:
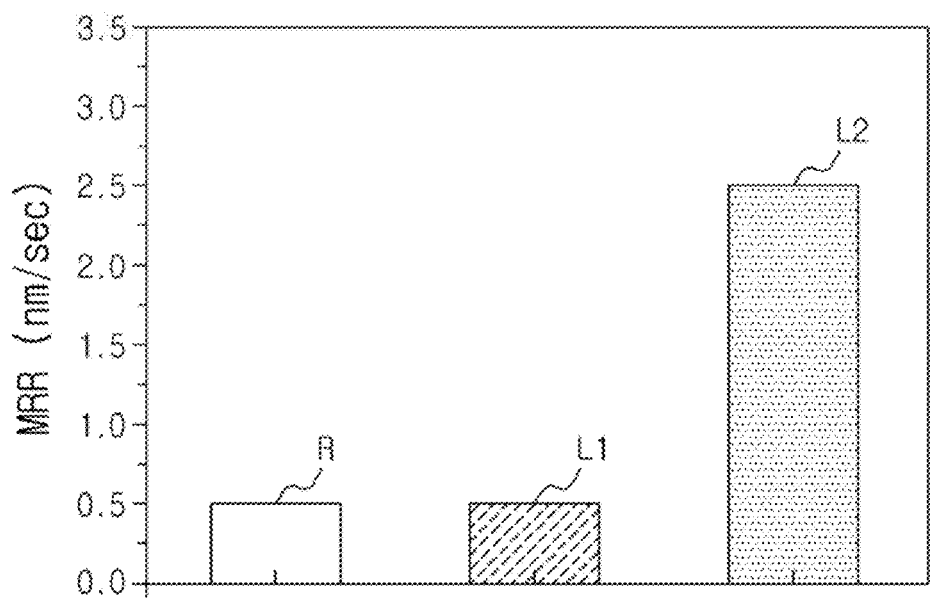
FIG. 5 is a graph illustrating an MRR of a chalcogenide film formed of GeSbTe to be polished when a polishing composition according to the present invention is used and a conventional silica slurry is used.

FIG. 5 is a graph illustrating an MRR of a chalcogenide film formed of GeSbTe to be polished when a polishing composition according to the present embodiment is used and a conventional silica slurry is used. A bar indicated by R is a polishing rate when a polishing composition using silica particles is used, and bars indicated by L1 and L2 are polishing rates when polishing compositions using nano-diamond particles obtained through a 1-hour milling time and a 6-hour milling time are used.

Referring to FIG. 5, a polishing rate was 0.5 nm/sec (R), 0.45 nm/sec (L1), and 2.54 nm/sec (L2). It is found from FIG. 5 that when the polishing compositions according to the present embodiment are used, similar or higher polishing rate was achieved than that when the conventional silica slurry is used. In particular, it is found from the bars R and L2 that a polishing rate was increased from 0.5 nm/sec by 1.7 nm/sec (which is 240%).

Figure 6:
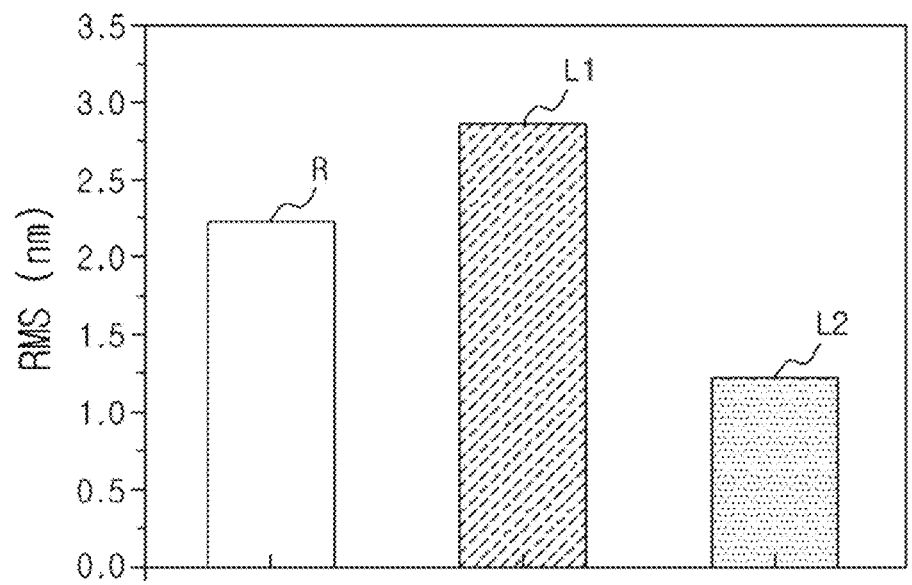
FIG. 6 is a graph illustrating an RMS surface roughness of a chalcogenide film formed of GeSbTe to be polished when a polishing composition according to the present invention is used and a conventional silica slurry is used.

FIG. 6 is a graph illustrating a RMS surface roughness of a chalcogenide film formed of GeSbTe to be polished when a polishing composition according to the present embodiment is used and a conventional silica slurry is used. A bar indicated by R is a surface roughness when a polishing composition using silica particles is used, and bars indicated by L1 and L2 are surface roughnesses when polishing compositions using nano-diamond particles obtained through a 1-hour milling time and a 6-hour milling time are used.

Referring to FIG. 6, a surface roughness was 2.17 nm (R), 2.8 nm (L1), and 1.2 nm (L2). It is found from the bar L1 and the bar L2 that as an attrition milling time increases, a surface roughness of a layer to be polished decreases. Also, it is found from the bar R and the bar L2 that a surface roughness when conventional silica particles are used is 2.17 nm and a surface roughness of the present embodiment is 1.2 nm which is 44% lower than 2.17 nm.

Referring to FIG. 6 along with FIG. 4, when an attrition milling time was longer than 3 hours, a surface roughness was lower than that when a conventional silica slurry was used. In particular, when an attrition milling time was between 4 to 6 hours, that is, in the samples #4 through #6, the best surface roughness characteristics were shown. It is found that the nano-diamond particles include primary particles or secondary particles having an average size of about 10 nm to about 100 nm.

Test 3: Comparison of Polishing Characteristics According to Content PSS

Polishing compositions obtained by mixing 0.1 weight % of nano-diamond particles and 1 weight % of hydrogen peroxide with a mixture before attrition milling for obtaining a polishing composition, adding 0.01 weight %, 0.1 weight %, 0.22 weight %, 0.3 weight %, 0.63 weight %, 0.94 weight %, 1.25 weight %, 1.56 weight %, 1.9 weight %, and 2.2 weight % of PSS, and performing milling for 6 hours were defined as samples #7 through #16 to be compared with one another.

Figure 7:
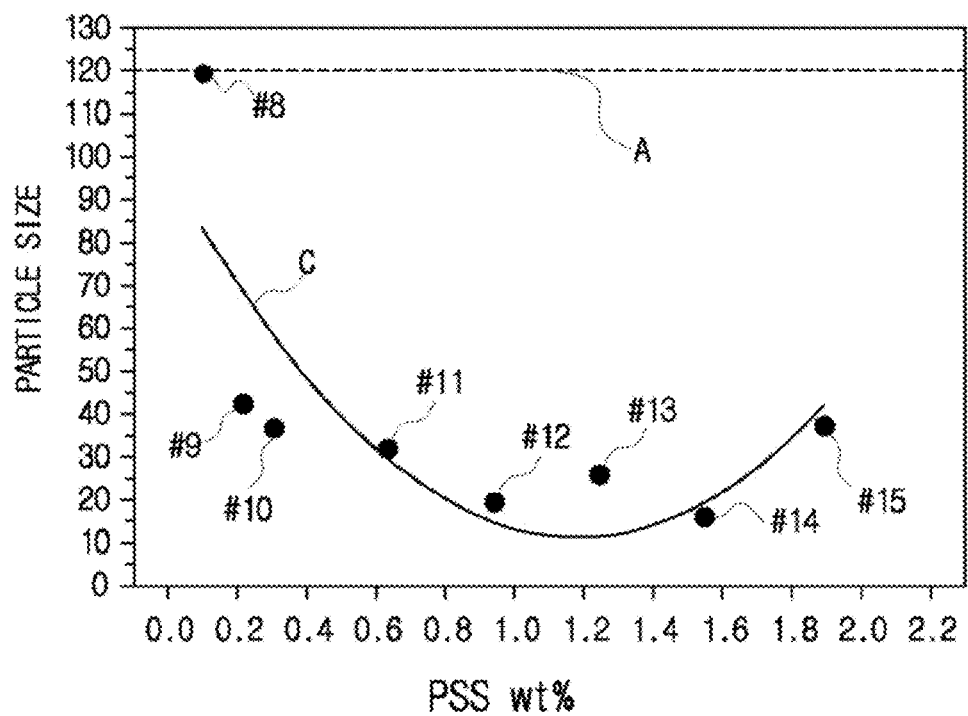
FIG. 7 is a graph illustrating a relationship between a content of poly(sodium 4-styrenesulfonate (PSS) and a size of nano-diamond particles.

FIG. 7 is a graph illustrating a relationship between a content of PSS and a size of nano-diamond particles. In FIG. 7, a dashed line A indicates 120 nm.

Referring to FIG. 7, as a content of the PSS increases, a size of the nano-diamond particles decreases and then increases. The size of the nano-diamond particles obtained in the samples #7 through #16 was 3046 nm (sample #7: not shown), 118.3 nm, 40.8 nm, 36.4 nm, 31.7 nm, 18.6 nm, 25 nm, 16 nm, 37 nm, and 227 nm (sample #16: not shown). When the content of the PSS is 0.01 weight % (in the sample #7) and 2.2 weight % (in the sample #16) which are outside a range of 0.03 weight % to 2 weight %, since the size of the nano-diamond particles is overly increased to exceed 120 nm, a scratch may occur and the sample is not appropriate as a polishing composition and thus was omitted in next tests.

Test 4: Comparison of Polishing Characteristics According to Content of PSS

Polishing characteristics using polishing compositions according to the samples #8 through #15 were compared. Conditions for a film to be polished and polishing conditions used to compare the polishing characteristics were the same as those in the test 2, and a polishing time was 20 sec.

Figure 8:
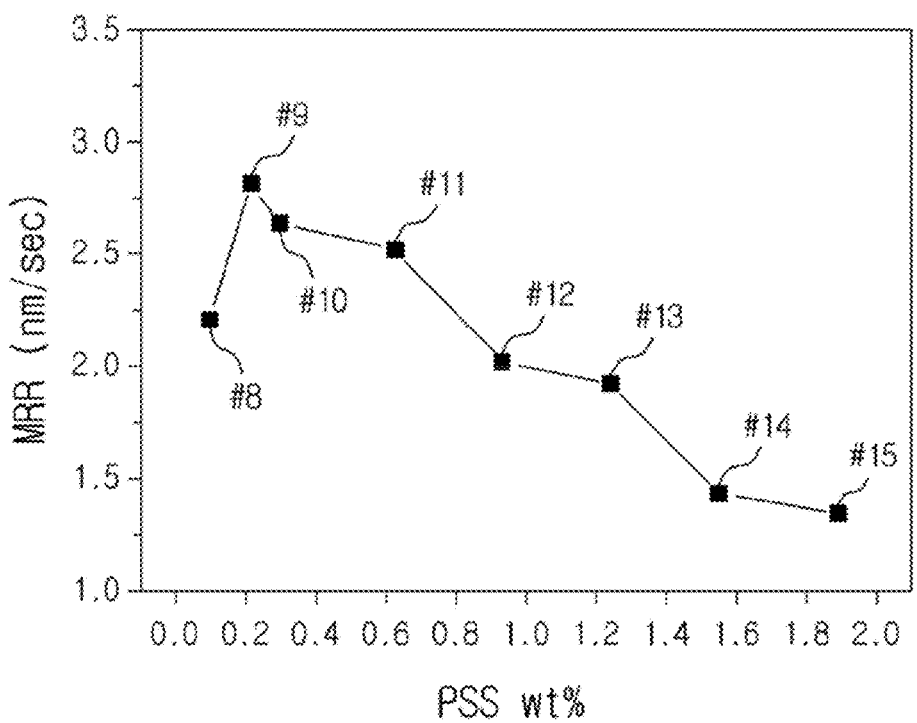
FIG. 8 is a graph illustrating an MRR of a chalcogenide film formed of GeSbTe to be polished using a polishing composition.

FIG. 8 is a graph illustrating an MRR of a chalcogenide film formed of GeSbTe to be polished using a polishing composition.

Referring to FIG. 8, as a content of PSS increases, a polishing rate of a layer to be polished increases and then decreases. A polishing rate when polishing was performed by using the samples #8 through #15 was 2.2 nm/sec, 2.81 nm/sec, 2.62 nm/sec, 2.51 nm/sec, 2.01 nm/sec, 1.91 nm/sec, 1.43 nm/sec, and 1.34 nm/sec. A polishing rate according to the present embodiment is much higher than a polishing rate of 0.5 nm/sec when a conventional silica slurry is used of FIG. 5.

Figure 9:
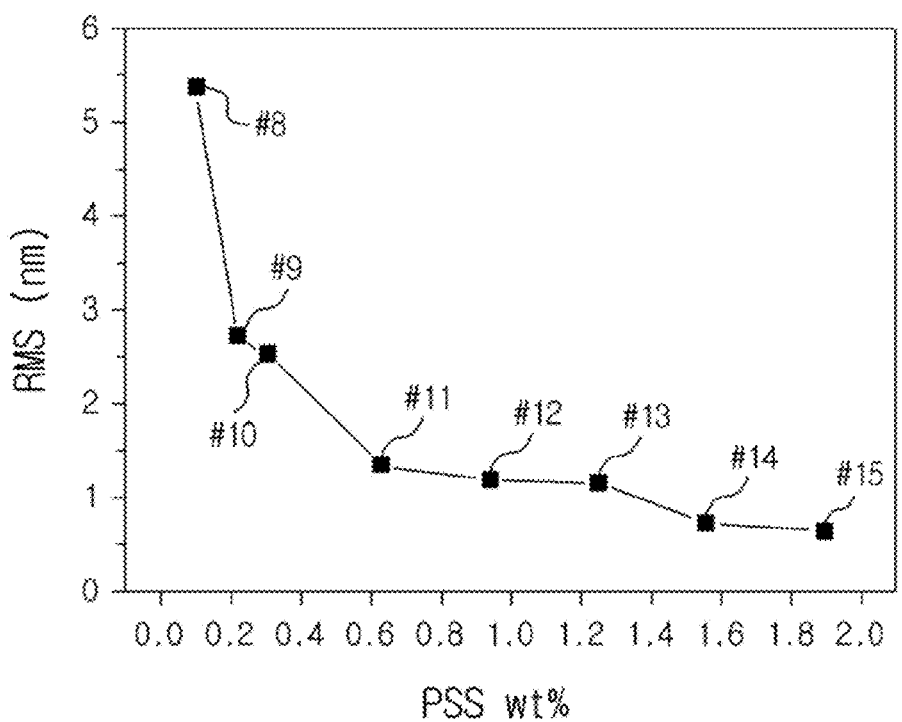
FIG. 9 is a graph illustrating an RMS surface roughness of a chalcogenide film formed of GeSbTe to be polished using a polishing composition.

FIG. 9 is a graph illustrating an RMS surface roughness of a chalcogenide film formed of GeSbTe to be polished using a polishing composition.

Referring to FIG. 9, as a content of PSS increases, a surface roughness of a layer to be polished decreases. A surface roughness when polishing was performed by using the samples #8 through #15 was 5.39 nm, 2.72 nm, 2.55 nm, 1.36 nm, 1.2 nm, 1.16 nm, 0.732 nm, and 0.648 nm. Considering that a surface roughness when a conventional silica slurry is used in FIG. 6 is 2.17 nm, it is preferable that a content of PSS is equal to or greater than 0.3 weight %. Since a surface roughness in each of the samples #11 to #15 is particularly low, it is preferable that a content of PSS ranges from 0.5 weight % to 2 weight % including 0.63 weight %, 0.94 weight %, 1.25 weight %, 1.56 weight %, and 1.9 weight %.

Figure 10A:
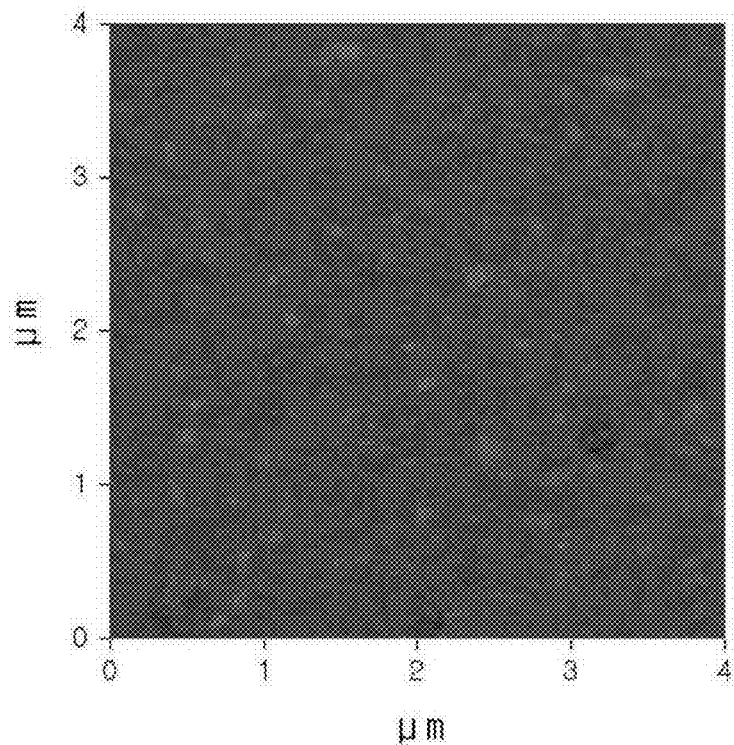
Figure 10B:
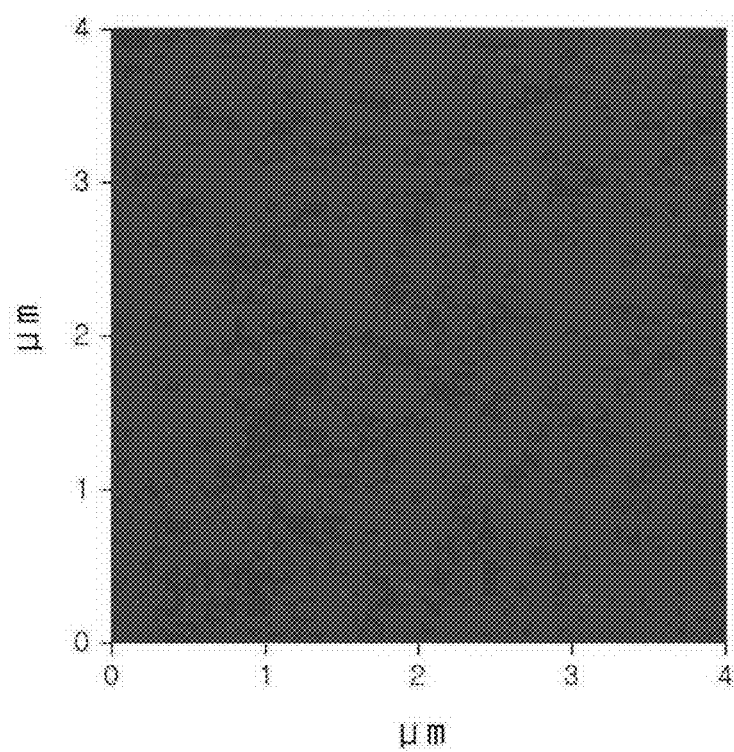

In order to compare polishing characteristics of the present embodiment, in addition to the comparative example 1 using a conventional silica slurry, even in a comparative example 2 using nano-diamond particles as a polishing material and not including PSS, an additional polishing process was performed assuming that other polishing process variables are the same. FIGS. 10A through 10C are atomic force microscope (AFM) images for measuring a surface roughness of a chalcogenide thin film after CMP.

FIG. 10A shows the comparative example 1. FIG. 10B shows the sample #4 in which a polishing composition is prepared by performing attrition milling for 4 hours. FIG. 10C shows the comparative example 2. When FIG. 10A and FIG. 10B are compared with each other, a surface roughness of FIG. 10A was 2.17 nm and a surface roughness of FIG. 10B was 1.2 nm which is 44% less than 2.17 nm (see description made with reference to FIG. 6). A polishing rate of FIG. 10A was 0.5 nm/sec and a polishing rate of FIG. 10B was 1.7 nm/sec which is 240% greater than from 0.5 nm/sec (see description made with reference to FIG. 5)

When FIG. 10B and FIG. 10C are compared with each other, when PSS is not used, a scratch having a size of several micrometers was observed, PSS was effectively used to improve dispersibility of nano-diamond particles, and PSS was essential when a water-based slurry was used.

As a surface roughness of a surface to be polished decreases to be equal to or less than a depth of focus (DOF) of a photolithography process, a high resolution photolithography process may be performed. In the present embodiment, a surface roughness has a minimum value of 1.2 nm. The surface roughness according to the present embodiment may be applied to a device having a design rule of substantially 20 nm.

According to the present invention, since a polishing composition includes nano-diamond particles and PSS for dispersing and stabilizing the nano-diamond particles, the nano-diamond particles having hydrophobic surfaces may be effectively stabilized in the polishing composition which is a water-based polishing composition. Also, since the nano-diamond particles stabilized in the polishing composition have a nano size and a hardness different from those of silica polishing particles of a conventional silica-based slurry, a uniform polishing rate for components may be achieved when a multi-compound metal compound thin film is polished, thereby ensuring a low surface roughness and a high polishing rate.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A water-based polishing slurry composition for planarizing a chalcogenide material or a chalcogenide glass material thin film, the polishing slurry composition comprising:
   nano-diamond particles as a polishing material; and
   poly(sodium 4-styrenesulfonate) as a dispersion stabilizer for the nano-diamond particles in the polishing slurry composition,
   wherein an average particle size of the nano-diamond particles ranges from 10 nm to 120 nm, a content of the nano-diamond particles in the polishing slurry composition ranges from 0.01 weight % to 10 weight %, and a content of the poly(sodium 4-styrenesulfonate) in the polishing slurry composition ranges from 0.03 weight % to 2 weight %, and
   wherein the chalcogenide material is selected from the group consisting of GeSbTe, GeSe, GeTeAs, GeSnTe, SeSnTe, GaSeTe, GeTeSnAu, $SeSb_2$, InSe, GeTe, BiSeSb, PdTeGeSn, InSeTiCo, InSbTe, $In_3SbTe_2$, $GeTeSb_2$, $GeTe_3Sb$, GeSbTePd, AgInSbTe, CuSe, and a combination thereof.

2. The polishing slurry composition of claim 1, wherein the nano-diamond particles comprise secondary particles, the secondary particles being provided by aggregating primary particles having an average particle size of 3 nm to 5 nm.

3. The polishing slurry composition of claim 1, further comprising deionized water and hydrogen peroxide.

4. The polishing slurry composition of claim 3, wherein a content of the deionized water in the polishing slurry composition ranges from 80 weight % to 99 weight %, and a content of the hydrogen peroxide ranges from 0.1 weight % to 10 weight %.

5. A method of preparing a polishing slurry composition for planarizing a chalcogenide material or a chalcogenide glass material thin film, the method comprising:
   providing a water-based mixture for milling comprising a nano-diamond powder as a polishing material and poly(sodium 4-styrenesulfonate) as a dispersion stabilizer for the nano-diamond particles; and
   attrition milling the water-based mixture until the nano-diamond powder is milled into nano-diamond particles having an average particle size of 10 nm to 120 nm,
   wherein a content of the nano-diamond particles in the polishing slurry composition ranges from 0.01 weight % to 10 weight %, and a content of the poly(sodium 4-styrenesulfonate) in the polishing slurry composition ranges from 0.03 weight % to 2 weight %, and
   wherein the chalcogenide material is selected from the group consisting of GeSbTe, GeSe, GeTeAs, GeSnTe, SeSnTe, GaSeTe, GeTeSnAu, $SeSb_2$, InSe, GeTe, BiSeSb, PdTeGeSn, InSeTiCo, InSbTe, $In_3SbTe_2$, $GeTeSb_2$, $GeTe_3Sb$, GeSbTePd, AgInSbTe, CuSe, and a combination thereof.

6. The method of claim 5, wherein the nano-diamond powder comprises an aggregation of particles having an average particle size of 3 nm to 5 nm.

7. The method of claim 5, wherein the nano-diamond powder is used as a polishing material and the poly(sodium 4-styrenesulfonate) is used as a dispersion stabilizer for the nano-diamond power in the polishing slurry composition.

8. A chemical mechanical polishing method comprising:
   providing a substrate having a surface, the substrate having a chalcogenide on the surface;
   causing a polishing pad to contact the surface of the substrate;
   providing a water-based polishing slurry composition between the polishing pad and the surface of the substrate, the polishing slurry composition comprising nano-diamond particles as a polishing material and poly(sodium 4-styrenesulfonate) as a dispersion stabilizer for the nano-diamond particles in the polishing slurry composition; and
   planarizing the surface of the substrate including the chalcogenide by using at least the polishing slurry composition,
   wherein an average particle size of the nano-diamond particles ranges from 10 nm to 120 nm, a content of the nano-diamond particles in the polishing slurry composition ranges from 0.01 weight % to 10 weight %, and a content of the poly(sodium 4-styrenesulfonate) in the polishing slurry composition ranges from 0.03 weight % to 2 weight %, and
   wherein the chalcogenide is selected from the group consisting of GeSbTe, GeSe, GeTeAs, GeSnTe, SeSnTe, GaSeTe, GeTeSnAu, $SeSb_2$, InSe, GeTe, BiSeSb, PdTeGeSn, InSeTiCo, InSbTe, $In_3SbTe_2$, $GeTeSb_2$, $GeTe_3Sb$, GeSbTePd, AgInSbTe, CuSe, and a combination thereof.

9. The method of claim 8, wherein the chalcogenide includes a thin film of chalcogenide glass material.

10. The method of claim 8, wherein the nano-diamond particles comprise secondary particles provided by aggregating primary particles having an average particle size of 3 nm to 5 nm.

* * * * *